(12) United States Patent
Kay et al.

(10) Patent No.: US 6,903,850 B2
(45) Date of Patent: Jun. 7, 2005

(54) SECURITY DEVICE

(75) Inventors: Ralph Kay, Basingstoke (GB); Brian William Holmes, Middlesex (GB)

(73) Assignee: De La Rue International Limited, Basingstoke (GB)

( * ) Notice: Subject to any disclaimer, the term of this patent is extended or adjusted under 35 U.S.C. 154(b) by 0 days.

(21) Appl. No.: 10/297,391

(22) PCT Filed: Jun. 27, 2001

(86) PCT No.: PCT/GB01/02906

§ 371 (c)(1),
(2), (4) Date: Jan. 10, 2003

(87) PCT Pub. No.: WO02/00446

PCT Pub. Date: Jan. 3, 2002

(65) Prior Publication Data

US 2004/0100707 A1 May 27, 2004

(30) Foreign Application Priority Data

Jun. 28, 2000 (GB) .............................. 0015871

(51) Int. Cl.[7] .................................. G03H 1/00
(52) U.S. Cl. .............................. 359/2; 359/567; 283/72; 283/86; 430/321
(58) Field of Search ...................... 359/2, 567; 430/1–2, 430/321; 283/72, 86, 94

(56) References Cited

U.S. PATENT DOCUMENTS

| 3,580,657 A | 5/1971 | Sheridon |
| 3,708,217 A | 1/1973 | McMahon |
| 4,662,653 A | 5/1987 | Greenaway |

(Continued)

FOREIGN PATENT DOCUMENTS

| EP | 0 304 194 | 2/1989 |
| EP | 0 395 410 A2 | 10/1990 |
| GB | 1 352 001 | 5/1974 |
| GB | 2 212 445 | 7/1989 |
| GB | 2 219 872 A | 12/1989 |
| GB | 2 221 550 | 2/1991 |
| GB | 2 340 281 A | 2/2000 |
| GB | 2 340281 | 2/2000 |
| WO | WO 91/06925 | 5/1991 |
| WO | WO 97/20298 | 6/1997 |

OTHER PUBLICATIONS

U.S. Appl. No. 10/415,903, Holmes et al, no date.
Trout et al., "15.3: Invited Paper: Volume Holographic Components for Display Applications", SID 00 Digest, pp. 202–205, DuPont Holographics, Wilmington, DE.
Hutley, "Diffraction Gratings", National Physical Laboratory, Academic Press, 1982, pp. 34–125.
Hasegawa et al., "11.3: Reflective Stacked Crossed Guest–Host Display with a Planarized Inner Diffuser", Society for Information Display International Symposium, pp. 128–1227, Digest of Technical Papers, vol. XXXI, Long Beach Convention Center, Long Beach, California, May 16–18, 2000.
Bjelkhagen, "Selected Papers on Fundamental Techniques in Holography", SPIE Milestone Series, vol. MS 171.

*Primary Examiner*—Leonidas Boutsikaris
(74) *Attorney, Agent, or Firm*—Oliff & Berridge, PLC

(57) ABSTRACT

A security device has a substrate formed with a surface relief defining an optically variable effect generating structure. At least two different reflection enhancing materials are provided on, or on the same side of, substrate with respect to the surface relief, whereby the optically variable effect can be viewed against a background defined by the reflection enhancing materials.

24 Claims, 4 Drawing Sheets

U.S. PATENT DOCUMENTS

| | | |
|---|---|---|
| 5,044,707 A | 9/1991 | Mallik |
| 5,128,779 A | 7/1992 | Mallik |
| 5,142,383 A | 8/1992 | Mallik |
| 5,145,212 A | 9/1992 | Mallik |
| 5,332,488 A * | 7/1994 | Mitsuji ................ 205/181 |
| 5,411,296 A | 5/1995 | Mallik |
| 5,648,165 A | 7/1997 | Phillips et al. |
| 5,663,816 A | 9/1997 | Chen et al. |
| 5,742,411 A * | 4/1998 | Walters ................... 359/2 |
| 5,757,521 A * | 5/1998 | Walters et al. ........... 359/2 |
| 5,812,229 A | 9/1998 | Chen et al. |
| 5,815,292 A * | 9/1998 | Walters ................... 359/2 |
| 5,936,751 A | 8/1999 | Wenyon |
| 6,010,751 A | 1/2000 | Shaw et al. |
| 6,369,919 B1 | 4/2002 | Drinkwater et al. |
| 6,761,959 B1 * | 7/2004 | Bonkowski et al. ...... 428/156 |

* cited by examiner

Indicia

SECURITY DEVICE

BACKGROUND OF THE INVENTION

1. Field of Invention

The invention relates to a security device, for example for use on documents and articles of value such as bank notes and the like to reduce the risk of counterfeiting.

2. Description of Related Art

A common form of security device is an optically variable device, such as a hologram or diffraction grating. These devices are commonly formed as relief structures in a substrate, which is then provided with a reflective coating, for example a continuous or partial metallic layer to enhance the replay of the device. The device is then adhered to the article or document which is to be secured.

With the increased sophistication of counterfeiters, it is important to develop known devices so as to enhance their security.

Some examples of known security devices are described in U.S. Pat. No. 5,815,292, U.S. Pat. No. 5,742,411, U.S. Pat. No. 4,662,653 and EP-A-0395410.

SUMMARY OF THE INVENTION

In accordance with the present invention, a security device comprises a substrate formed with a surface relief defining an optically variable effect generating structure; and at least two different reflection enhancing materials on, or on the same side of the substrate with respect to, the surface relief, whereby the optically variable effect can be viewed against a background defined by the reflection enhancing materials.

We have devised a new type of security device which has a number of distinct advantages over the conventional technologies. For example, by using reflection enhancing materials with distinctly differing appearances (such as copper and aluminium) it is possible to form optically variable images, such as holograms, which will have their "rainbow" diffraction spectrum spatially modulated by the reflective hue of the underlying metallic pattern, to create a new and secure visual effect. These metallic colours and replays are very difficult to match by dyeing or colouring material layers.

In particular, the invention leads to a security device which will, even to the untrained eye, have an aesthetic, distinct, and novel appearance when compared with a conventional device. This approach also presents a very high technological barrier for the counterfeiter to surmount and serves to distinguish the genuine hologram from a counterfeit image even in the case where the counterfeiter has managed to sufficiently reproduce the holographic effect/ microstructure either optically or by mechanical replication.

Although the invention is primarily concerned with the generation of holograms, the surface relief can more generally define a diffraction grating, or even a coarser form of microstructure, for example regular triangulated features with sizes >10 microns or randomised features which change in a visually significant way, the specular characteristics in certain areas.

In some examples, the reflection enhancing materials define a common plane. Thus, the reflection enhancing materials may be laid down side by side, or one reflection enhancing material may be laid down in portions while the other reflection enhancing material is provided fully over the substrate and the one reflection enhancing material, so filling the gaps between the one reflection enhancing material.

In other examples, the reflection enhancing materials are provided in different layers, either in contact with one another or separated by one or more transparent intermediate layers. This latter approach leads to further advantages in that where these reflection enhancing layers are metals, the intermediate layer or layers can comprise a dielectric, one or both of the layers being formed as a pattern defining a rf resonant circuit, which can be remotely detected.

The device may also be verified by chemical or physical analysis.

The contacting of dissimilar metals also causes galvanic potentials to be established and these can be used to sense the presence of the layer. The magnitude of the potentials can be tailored by judicious choice of materials.

When the reflection enhancing materials are laid down in respective, different layers, the reflection enhancing material in the layer furthest from the surface relief must in general be visible through the layer containing the first reflection enhancing material (unless this further layer is covert). This can be achieved by using a reflection enhancing material which is partially transparent, for example a high refractive index layer such as ZnS, or by providing the first reflective material in a partial manner, for example partially demetallising the layer to leave clear and opaque regions in defined patterns, e.g. dots.

The reflection enhancing materials may also be laid down in patterns defining indicia, graphic elements, logos, crests, bar codes (1D and 2D) and the like which may or may not be related to or registered with the optically variable effect, such as a hologram, generated by the surface relief structure.

Typically, these reflection enhancing materials will comprise metals, such as aluminium and copper, but other metals could also be used such as tin, nichrome, silver, gold, nickel, stainless steel and also various alloys. When, for example, the copper is applied over an aluminium layer it provides protection from physical attack, copper being more durable than aluminium, and can also act as an electromagnetic shield should this property be required. Alternatively, as mentioned above, other materials such as high refractive index layers including ZnS could be used in conjunction with semi-conductors, for example silicon or germanium, and other optically distinctive inorganic and organic films.

The reflection enhancing materials may be laid down in a variety of ways, and in preferred examples are at least in part in a predetermined pattern of for example dots or lines. For example, if the first reflection enhancing layer (e.g. aluminium) is formed with a fine array of dots/lines (too small to be individually discerned by the naked eye) then a continuous overlay of the second reflection enhancing layer (e.g. copper) will create a weighted two colour halftone or screen. By adjusting the relative screen weights of the two metals a range of colours/hues in the range aluminium-goldbronze-copper could be formed. Of course by macro patterning the screen weight of the first layers (preferably in register with the holographic design) to vary between 100% (solid Aluminium) and 0% (solid copper) patterned graded hues could be formed.

Graded structures formed in this way will have a novel attractive appearance with the copper toning down the sometimes overpowering brightness or lustre of aluminium particularly when applied to more aesthetically traditional areas such as banknotes. The backing layer could also serve to increase the chemical durability and heat resistance of the device.

In some cases, at least one of the reflection enhancing materials will extend to an edge of the substrate. However, in the preferred approach, there is no reflective material in a border region extending along an edge of the substrate. This is particularly useful in embodiments which constitute transfer foils and the like so as to minimise problems such as edge flashing and minor mis-registration or alignment of hot stamping dies.

A further development would be to fabricate the fine screening of aluminium dots/lines such that their spacing or pitch matched that of a lenticular prism or microlens array which functions as the decoder. Therefore when the lenticular array is placed over the bimetallic hologram, striking moiré effects will be observed—these effects being orientation sensitive. This effect could be used to reveal clear silver/copper colour shifts in selected areas. This could be taken one step further and used to incorporate covert information (generically and rather loosely referred to within the industry as scambled indicia features) within the screened/metallisations. This is done by slightly changing the spacing or orientation of the dots/lines, within the localised regions that define the covert pattern (which could be alphanumeric characters, graphical features etc.). The level of change being sufficiently small that the localised covert pattern cannot be picked out by the naked eye however when the periodicity matched decoder is placed over the hologram then the covert pattern is clearly revealed. This approach has been used for some time with conventionally printed structures, for example as discussed in patent WO 97/20298 (i.e. scrambled indicia). Its use with metallised layers is, however, novel.

The presence of a line structure of alternating materials, which have dissimilar radiation absorption characteristics, will also provide effects, which could be used to encode security indicia.

Although the use of two reflection enhancing materials has been described, the invention is applicable to three or more such materials.

In an important embodiment, a further image may be provided using ink or the like between the surface relief and an adjacent one of the reflection enhancing materials. This is described in much more detail in WO-A-91/06925 incorporated herein by reference.

It will be understood that the security device can be used with a variety of documents and articles, but is particularly designed for use with documents of value, including visas, passports, licences, cheques, identity cards, plastic cards, banknotes, tickets, bonds, share certificates, vouchers, passes, permits, electrostatic photocopies, electrostatic laser printed materials, brand authentication labels, serial numbering slips, quality control certificates, bills of lading and other shipping documentation, legal documents and tamper evident labels.

The device can also be used on/in features such as threads, tear tapes, self adhesive foils, hot stamping foils or other Brand Protection applications such as shrink sleeves.

The device can be used to introduce barcodes or magnetic reading indicia amongst other machine readable type features. It could also be used with tamper evident features.

BRIEF DESCRIPTION OF THE DRAWINGS

Some examples of security devices according to the invention will now be described with reference to the accompanying drawings in which.

DETAILED DESCRIPTION OF PREFERRED EMBODIMENTS

Figure 1:
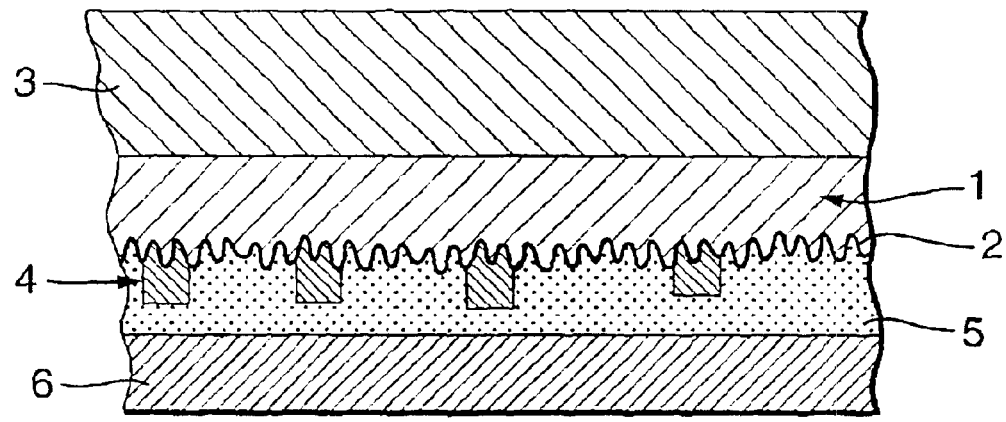
FIG. 1 is a schematic, cross-section through one example of the device, not to scale.

The device shown in FIG. 1 comprises a lacquer or polymeric substrate 1 having a typical thickness of 1–5 $\mu$m, into one surface of which has been embossed an optically variable microstructure 2. The substrate 1 is supported on a carrier layer 3, for example polypropylene or PET with a typical thickness of 10–50 $\mu$m and the interface between the two layers has been treated, for example, with corona discharge or wax release, so that they can be detached in a controllable way.

The surface relief 2 is vacuum coated with an aluminium layer 4, typically 20–100 nm thick, which is then partially demetallised in a designed pattern to render it partially transparent. The aluminium layer is then coated with a thicker layer of copper 5, typically 40–200 nm, and finally a 0.5–20 $\mu$m thick hot melt adhesive layer 6 (or a pressure sensitive adhesive for cold transfer) is provided on the copper layer 5.

In use, the device shown in FIG. 1 with a hot melt adhesive 6 is applied to a document to be secured, and a hot stamping die is brought into engagement with the carrier 3, causing the adhesive 6 to be activated so as to adhere the device to the document, following which the carrier 3 is peeled away.

When the device is viewed through the lacquer layer 1, the viewer will see the hologram generated by the surface relief 2 in a conventional manner. However, that hologram will be viewed against a coloured background having a very distinctive appearance.

The example just described is in the form of a transfer structure but the invention is also applicable to hand applied labels. In that context, the carrier layer 3 would be omitted while the adhesive 6 would be a pressure sensitive adhesive.

As mentioned above, a variety of different types of device can be created.

Figure 2:
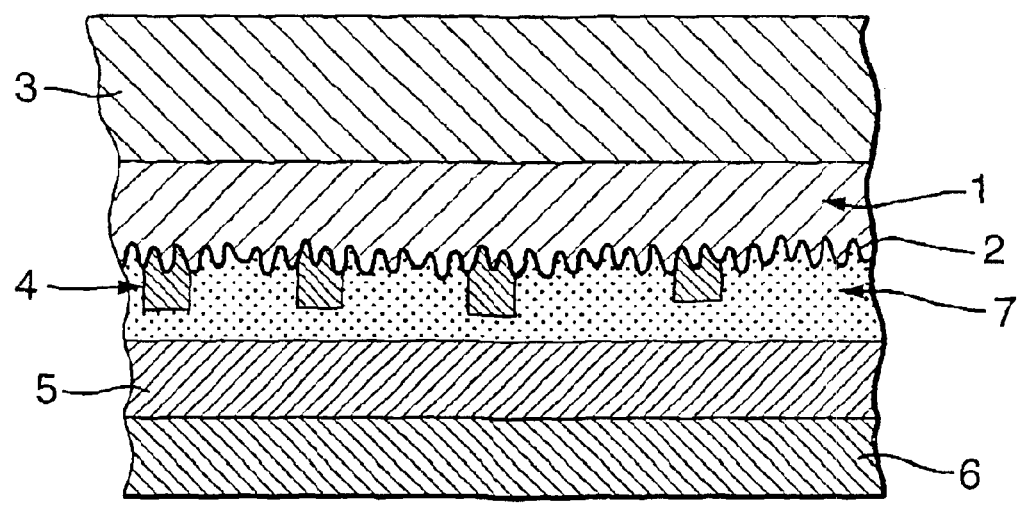
FIG. 2 is a schematic, cross-section through a second example.

FIG. 2 illustrates an example in which the components having the same form as in FIG. 1 are given the same reference numerals. The difference in this case is that a dielectric layer 7 has been inserted between the demetallised aluminium 4 and the copper layer 5. Typical dielectrics include 200 nm thick zirconium dioxide or zinc sulphide. Alternatively, a semiconductor layer such as 50 nm thick silicon could be used. The dielectric will be transparent so that on viewing the device, the hologram generated by the surface relief 2 can be seen against the background defined by the aluminium layer 4 and the copper layer 5. However, the device shown in FIG. 2 has the additional property that it can be detected electronically by virtue of the capacitance generated between the two metal layers 4,5. This will have a distinctive "signature" allowing the device to be identified.

In a further alternative (not shown) the copper layer 5 could be patterned to define a rf resonant circuit, again for electronic verification. Organic polymer coatings or films could be interposed between the demet aluminium 4 and the copper layer 5. These could be tinted, and/or contain fluorescent materials as more fully described in EP-A-0497837.

Figure 3:
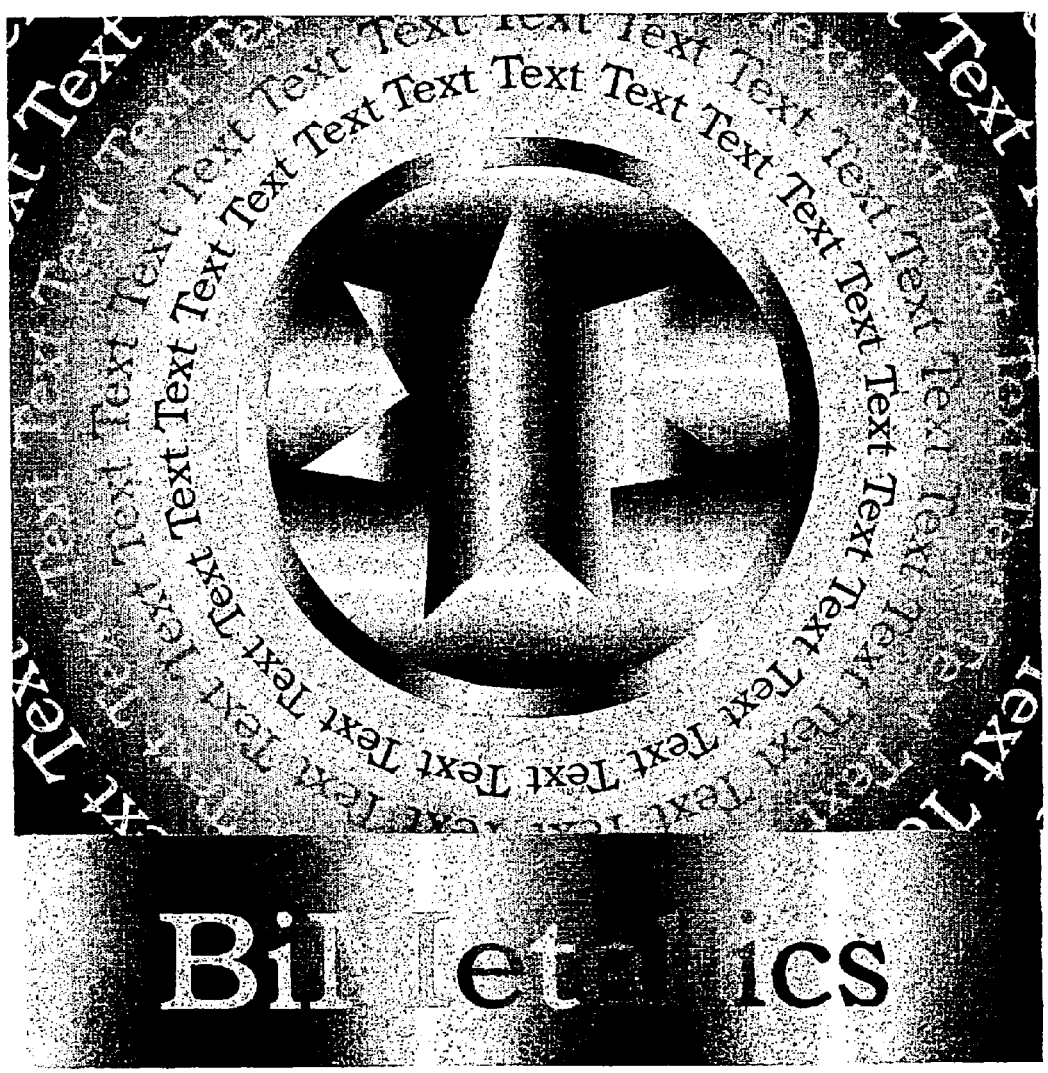
FIG. 3 is a plan view of an example based on FIG. 2.

FIG. 3 illustrates the appearance of a device constructed similar to FIG. 2, the darkest areas corresponding to 100% copper and the lightest areas 100% aluminium. A wide variety of densities is used to vary the colours.

Figure 4:
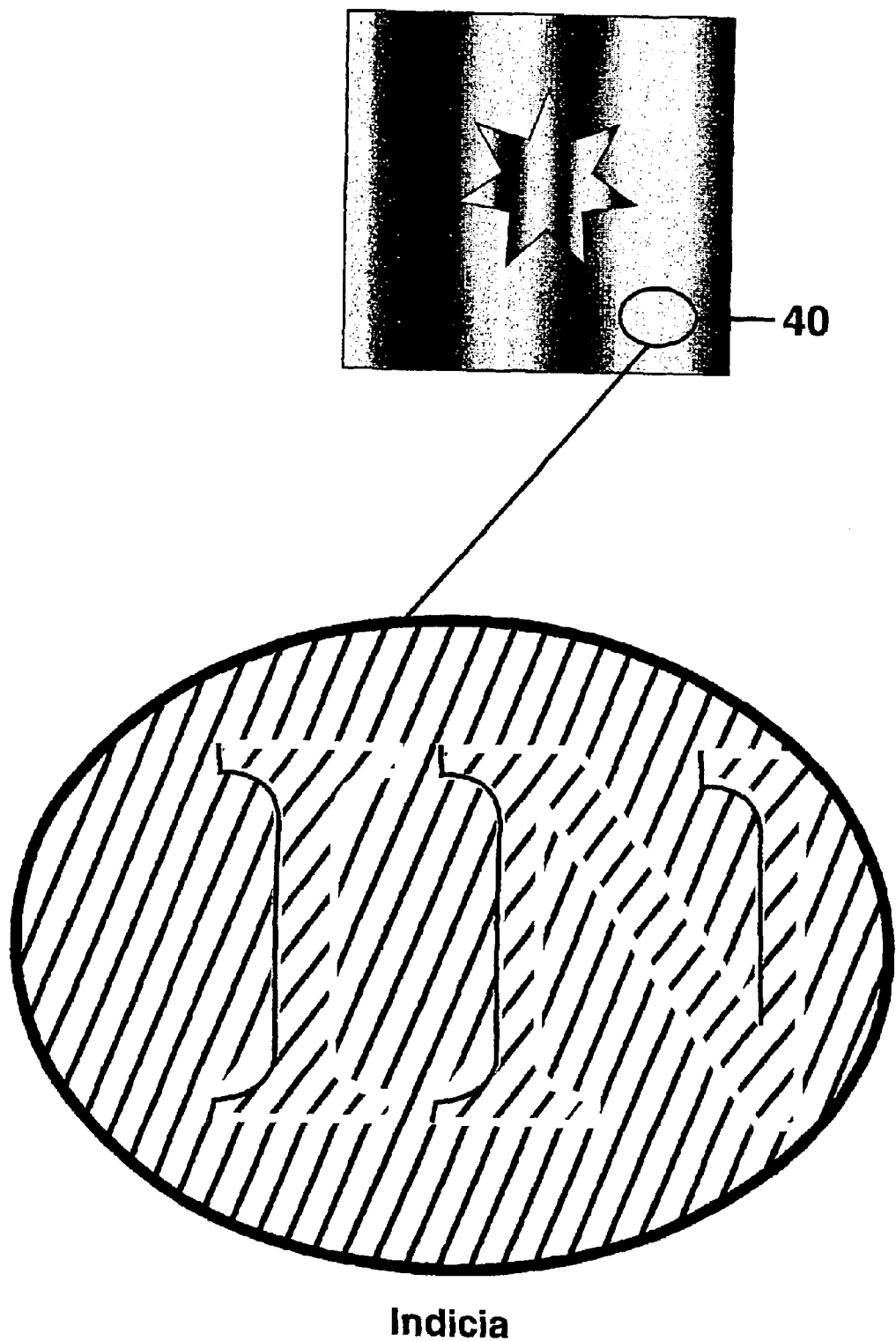
FIG. 4 is a plan of an example including a covert feature.

FIG. 4 illustrates a device using copper and aluminium and also including a covert feature 40 defining indicia "IN" and formed by using different line patterns. This could be viewed using a suitably formed line or dot screen.

Figure 5:
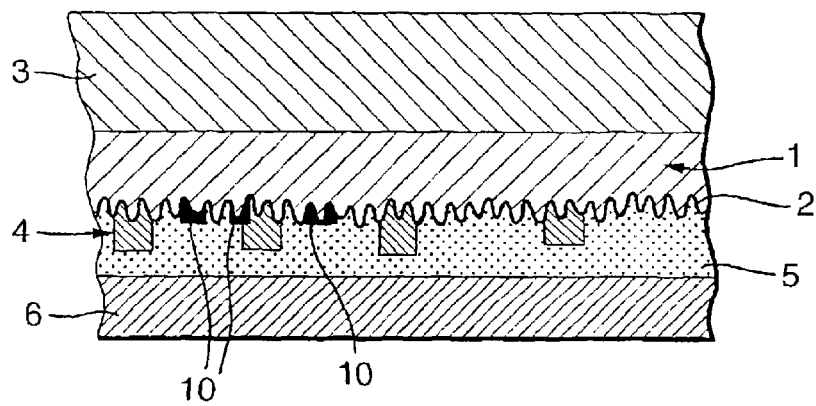
FIG. 5 is a view similar to FIG. 1 but illustrating a further example.

FIG. 5 illustrates a further example which has the same constructions as shown in FIG. 1 except with the addition of ink images schematically indicated at 10 which have been printed onto the surface relief 2. Typically, these ink images will be in the form of security indicia and may have been provided using any known ink and as more fully described and explained in WO-A-91/06925.

Figure 6:
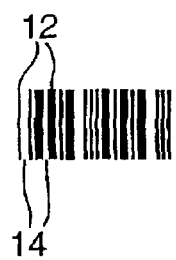
FIG. 6 illustrates the appearance of a bar code.

An important form of image produced by the reflective layers 4,5 is a bar code. An example of a bar code is shown in FIG. 6. The dark lines 12 are formed using copper while the intermediate "white" lines 14 are formed using aluminium. The feature is viewed under blue light when copper appears black and aluminium appears white.

In the embodiments described so far, the aluminium layer 4 is provided in a discontinuous manner while the copper layer 5 is generally continuous although could be discontinuous also. This means that the perimeter of the security device will be defined by metal and thus the shape of the device will be formed by the shape of the blocking/hot stamping die (in the case of hot transfer foils) or die-cutting head (in the case of hand applied labels). However, much more intricately patterned metallic shapes or regions can be achieved by utilizing the various print based methods for achieving selective patterning of the metal layer(s) or selective removal of the metal layer(s). In particular, the use also of a discontinuous copper layer 5 is particularly important.

In a further embodiment particularly useful from a manufacturing point of view, there will be no metal present (copper or aluminium) within a border region of the device, for example within say 1 mm of the perimeter/edge of the substrate. This facilitates effective transfer of images defined by intricately patterned regions of metal and minimises various problems as described above.

Figure 7:
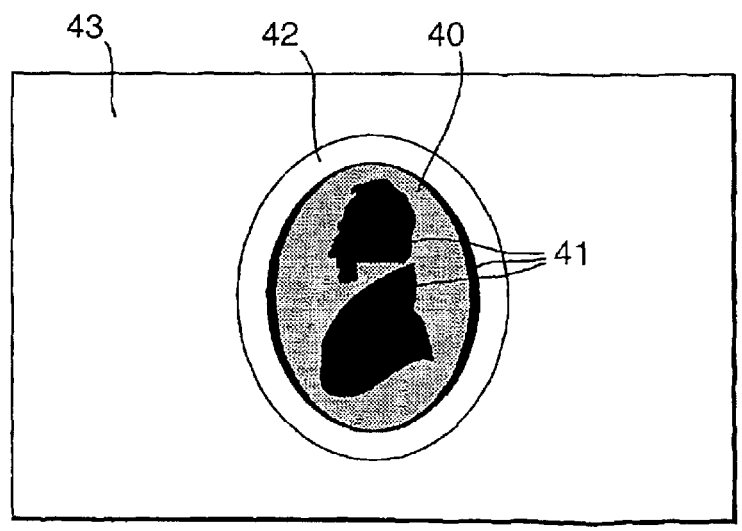
FIG. 7 is a plan view of a still further example.

An example of this further embodiment is shown in FIG. 7. A first reflection enhancing layer is visible in a region 40 while a second reflection enhancing layer is visible in a region 41. A border region 42 is transparent and defined by uncoated areas of the substrate 1 which have been transferred or applied to the final substrate 43.

In the preferred implementation of this embodiment of FIG. 7, the first reflection enhancing layer in the region 40 is aluminium and the second reflection enhancing layer in the region 41 is copper or a high copper-content alloy.

Techniques for demetallising aluminium are well known in the art (see, for example, U.S. Pat. No. 5,044,707, U.S. Pat. No. 5,142,383, U.S. Pat. No. 5,128,779, U.S. Pat. No. 5,145,212), and normally involve the chemical etching of the deposits using sodium hydroxide solutions. This approach does not work well on copper-based alloys. A variety of demetallisation processes may be used for patterning copper layers, as follows.

The copper layer may be chemically etched using acid solutions such as:

| | |
|---|---|
| Hydrochloric acid | 50% v |
| Ferric chloride (40° Baumé) | 50% v |
| (Room temperature) | |

Or

| | |
|---|---|
| Sulphuric acid (66° Baumé) | 5–10% v |
| Ferrous sulphate | 100 g/litre |
| (40–60° C.) | |

Other etchants may also be used such as nitric acid but generally the above systems are the most convenient to work with.

As with the techniques used for demetallising aluminium layers, the etching may be carried out by directly printing the etchant onto the surface, or preferably by printing an etchant resistant masking layer and then either immersing the web or spraying the etchants over its surface.

The areas where copper is not required may be precoated with mask composed of a solvent (e.g. water, alcohol) soluble material and then copper coated. In the latter case subsequent immersion in the appropriate solvent then causes the precoat or mask to dissolve and the copper on top of it to be dislodged. This approach has the advantage that non-corrosive materials may be used, An alternative (but functionally inferior) approach is to print an opaque layer of (preferably white pigmented) ink onto the microstructure either prior to the first or the second reflection enhancing layer coating processes. In this case area 42 in FIG. 5 is no longer a transparent area since the embossing layer has now been coated with an opaque ink.

What is claimed is:

1. A security device, comprising:
   a substrate formed with a surface relief defining an optically variable effect generating structure; and
   at least two different opaque reflection enhancing materials, at least one of which is discontinuous, on the same side of the substrate with respect to the surface relief, each of the at least two reflection enhancing materials having the surface relief profile and having different hues, whereby the optically variable effect can be viewed against a background defined by the at least two reflection enhancing materials.

2. A device according to claim 1, wherein the surface relief defines at least one of a holographic image and a diffraction grating generating microstructure.

3. A device according to claim 1, wherein the at least two opaque reflection enhancing materials contact said surface relief.

4. A device according to claim 1, wherein the at least two opaque reflection enhancing materials are provided in respective, different layers on the substrate.

5. A device according to claim 4, wherein at least one transparent layer having the surface relief profile is provided between the opaque reflection enhancing materials.

6. A device according to claim 5, wherein the at least one transparent layer between the opaque reflection enhancing materials is a metal oxide having dielectric properties.

7. A device according to claim 1, wherein the at least two opaque reflection enhancing materials are discontinuous.

8. A device according to claim 1, further comprising an ink layer between the surface relief and at least one of the at least two opaque reflection enhancing materials.

9. A device according to claim 1, wherein at least one of the at least two opaque reflection enhancing materials is provided at least in part in a predetermined pattern.

10. A device according to claim 9, wherein the predetermined pattern is defined by dots or lines having a regular periodicity.

11. A device according to claim 10, wherein at least one of the at least two opaque reflection enhancing materials is provided in a form so as to define a covert image, which is viewable with a microlens array, lenticular array, or other appropriate optical decoder matched to the periodicity.

12. A device according to claim 9, wherein at least one of the at least two opaque reflection enhancing materials is provided such that its optical density varies in one or more lateral dimensions.

13. A device according to claim 1, wherein no opaque reflection enhancing material is provided on a border region of the substrate.

14. A device according to claim 1, wherein at least one of the at least two opaque reflection enhancing materials is a metal.

15. A device according to claim 14, wherein the metal is one of aluminum and copper or copper rich alloy.

16. A device according to claim 15, wherein the metal has been demetallised using an acidic solution based on hydrochloric, sulphuric or nitric acid.

17. A device according to claim 14, wherein the metal is provided in a pattern which defines a rf resonant circuit.

18. A device according to claim 14, wherein each of the at least two opaque reflection enhancing materials are metals separated by an insulating layer to define a capacitance.

19. A device according to claim 1, further comprising a printed image on the surface relief.

20. A document or article of value carrying a security device according to claim 1.

21. A device according to claim 1, wherein each of the at least two opaque reflection enhancing materials comprise metals or alloys.

22. A device according to claim 21, wherein the at least two opaque reflection enhancing materials are discontinuous.

23. A device according to claim 21, wherein the at least two opaque reflection enhancing materials have been vacuum deposited.

24. A device according to claim 9, wherein the predetermined pattern is at one of a bar code and indicia.

* * * * *